United States Patent
Takei

(10) Patent No.: US 6,200,506 B1
(45) Date of Patent: Mar. 13, 2001

(54) METHOD FOR FORMING A HEADREST

(75) Inventor: Yoshiyuki Takei, Akishima (JP)

(73) Assignee: Tachi-Co., LTD, Tokyo (JP)

( * ) Notice: Subject to any disclaimer, the term of this patent is extended or adjusted under 35 U.S.C. 154(b) by 0 days.

(21) Appl. No.: 09/458,984

(22) Filed: Dec. 10, 1999

(51) Int. Cl.[7] .............................. B29C 44/06; B29C 44/12

(52) U.S. Cl. ........................ 264/46.6; 264/46.7; 264/276

(58) Field of Search ................................. 264/46.6, 46.7, 264/276

(56) References Cited

U.S. PATENT DOCUMENTS

| | | | |
|---|---|---|---|
| 4,738,809 | * | 4/1988 | Storch .................................. 264/46.7 |
| 4,908,170 | * | 3/1990 | Kurimoto ............................. 264/46.7 |
| 5,004,572 | * | 4/1991 | Kurimoto ............................. 264/46.7 |
| 5,135,593 | * | 8/1992 | Quirin ................................. 264/46.7 |
| 5,478,136 | * | 12/1995 | Takeuchi et al. ..................... 264/46.7 |
| 5,730,917 | * | 3/1998 | Ishikawa et al. ..................... 264/46.7 |
| 5,855,831 | | 1/1999 | Takei . |
| 5,984,414 | * | 11/1999 | Adachi et al. ....................... 264/46.7 |
| 6,120,100 | * | 9/2000 | Palazzolo et al. ................... 264/46.6 |

FOREIGN PATENT DOCUMENTS 9-108066    4/1997    (JP) .

* cited by examiner

Primary Examiner—Allan R. Kuhns
(74) Attorney, Agent, or Firm—Browdy and Neimark

(57) ABSTRACT

A method for forming a headrest, which involves pre-assembling an incomplete headrest unit including a trim cover assembly having an opening therein and a headrest frame having been placed via the opening within the trim cover assembly, and a foaming process for subjecting such incomplete headrest unit to a foaming by injecting a liquid base foaming material into the interior of trim cover assembly and curing that foaming material, so as to produce a final headrest. In the method, an injection nozzle device is utilized, which has an entrapping or catching element provided at the nozzle portion thereof. Prior to the foaming process, the nozzle portion of injection nozzle device is inserted via the opening into the interior of trim cover assembly in a first direction, and then drawn in a second direction opposite to the first direction, thereby causing the opening to be closed positively by the catching element, to prevent leakage of the liquid base foaming material from the opening. Further, at least one extension may be formed at the opening, which extends continuously from the trim cover assembly into the interior of the latter, so that such at least one extension may be caught by the catching element for the purpose of positively closing the opening against the leakage of liquid base foaming material therethrough.

9 Claims, 3 Drawing Sheets

METHOD FOR FORMING A HEADREST

BACKGROUND OF INVENTION

1. Field of the Invention

The present invention relates to a method for forming a headrest adapted for use on an automotive seat, and more particularly to the method of this kind wherein the headrest is formed by injecting a liquid foaming base material into the interior of a preformed three-dimensional trim cover assembly having a predetermined headrest outer shape and then subjecting both liquid foaming base material and trim cover assembly to foaming integrally together.

2. Description of Prior Art

According to a typical known foaming process for producing a headrest, a three-dimensional trim cover assembly of a predetermined headrest shape is firstly provided by sewing together required separate cover sections, with an opening defined therein, then a generally U-shaped headrest frame having a pair of headrest stay portions is inserted through the opening into the interior of the trim cover assembly, and thereafter, a liquid base foaming material is injected and cured in the trim cover assembly, so as to produce a foamed resultant headrest with the pair of headrest stay portions projecting therefrom.

This foaming process has encountered the problem that the liquid base foaming material is leaked through the opening to the outside of trim cover assembly, leaving an objectionable spot thereon. Conventionally, in an attempt to prevent the leakage of liquid base foaming material, typical solution is for example found in the Japanese Granted Patent Pub. No. 6-45149 and Japanese Laid-Open Patent Pub. No. 7-31759, wherein a pair of extensions are formed in the portion of trim cover assembly corresponding to that opening such as to extend inwardly from the opening into the trim cover assembly, and a flattened tubular film piece is fitted between the pair of extensions, so that an injection nozzle can be inserted through the flattened tubular piece into the interior of trim cover assembly, and, during the foaming process, the liquid base foaming material being injected from the nozzle is prevented by those two extensions and film from the opening in question.

However, such conventional method requires cutting of an externally exposed part of the film which projects outwards from the opening, subsequent to the foaming process, thus resulting in a troublesome labor on the part of worker and also in the high likelihood of a cut, tear or undesired damage being given to the trim cover assembly when the worker cuts off the film.

SUMMARY OF THE INVENTION

In view of the above-stated drawbacks, it is therefore a primary purpose of the present invention to provide an improved method for forming a headrest which eliminates the foregoing various troubles and effectively prevents a liquid base foaming material against leakage from the opening of trim cover assembly during a foaming process.

In order to achieve such purpose, in accordance with the present invention, there is basically provided the steps of:

pre-assembling an incomplete headrest unit comprising a three-dimensional trim cover assembly of a predetermined headrest configuration, which has an opening formed therein and an extension means extending therefrom via said opening into an interior of the three-dimensional trim cover assembly and a headrest frame means having a stay portion, wherein the headrest frame means has been inserted via the opening into and placed in the interior of three-dimensional trim cover assembly, with the stay portion projecting outwardly therefrom;

providing an injection nozzle means having a catching means for catching the extension means associated with the three-dimensional trim cover assembly;

inserting the injection nozzle means through the opening in a first direction toward the interior of three-dimensional trim cover assembly, while locating the catching means at the extension means therewithin;

drawing the injection nozzle means in a second direction opposite to such first direction, to thereby catch the extension means;

drawing further the injection nozzle means in such second direction, thereby causing the opening to be closed positively by the extension means and catching means thereafter, injecting a liquid base foaming material through the injection nozzle means into the interior of trim cover assembly;

curing the liquid base foaming material to form a foam padding integrally with the interior of trim cover assembly and headrest frame means; and thereafter, removing the injection nozzle means from the trim cover assembly, whereby the headrest is formed.

Accordingly, a positive closing of the opening is attained via the catching means to insure avoiding creation of any loosen point or clearance at the opening through which the liquid base foaming material will invade or will be leaked. Further, an increased mass of the liquid base foaming material being cured presses the extension means against an inner side of the trim cover assembly to thereby positively close the opening against leakage of the liquid base foaming material therethrough.

In one aspect of the present invention, the trim cover assembly and extension means are formed from a material having an elastic property, and a through-hole be formed in the extension means, thus having an elastic property for allowing its elastic deformation and recovery to its original diameter. In that instance, both injection nozzle means and catching means can be inserted through that through-hole while elastically deforming the same, at the step of inserting the injection nozzle means, and also removed via the through-hole from the trim cover assembly at the step of removing the injection nozzle means therefrom.

In another aspect of the present invention, the extension means may comprise first and second extensions which are resiliently biased to contact with each other to normally close the opening, wherein the first extension is greater in length than the second extension, with a projected part defined continuously from the first extension. In that instance, at the step of drawing further the injection nozzle means in the second direction, the projected part of the first extension is bent toward the free end of second extension, thereby causing a tight contact of such projected part with the end of second extension, so that the opening is positively closed by the first and second extensions. Further, the projected part of first extension is folded about the end of said second extension by a pressure applied from an increased mass of said liquid base foaming material being cured, rendering more positive the closing of the opening to insure preventing the liquid base foaming material from the opening;

Other various features and advantages of the present invention will become apparent from reading of the descriptions hereinafter with reference to the annexed drawings.

DETAILED DESCRIPTION OF PREFERRED EMBODIMENT OF THE INVENTION

Referring to FIGS. 1 through 8, there are illustrated preferred modes of method for forming a headrest (HD), by way of example, in accordance with the present invention.

Figure 1:
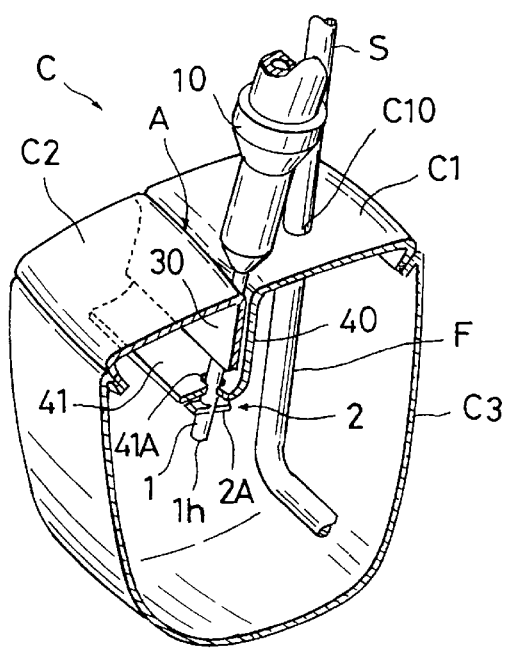
FIG. 1 is a partly broken schematic perspective view of an incomplete headrest unit prior to a foaming process in accordance with the present invention.
Figure 7:
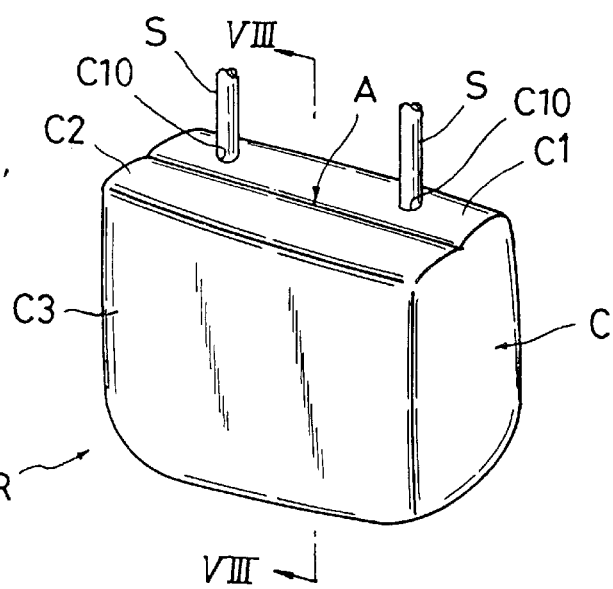
FIG. 7 is a partly broken schematic perspective view of a resulting headrest formed by the method of present invention.

FIGS. 1 and 7 show a trim cover assembly (C) to be used in the method, which is of the three-dimensional bag-shaped type having a predetermined outer configuration of headrest. The trim cover assembly (C) itself is preformed into the illustrated three-dimensional shape by sewing together required separate cover sections, as known in the art. In accordance with the present invention, the construction of trim cover assembly (C) is based on a three-layer lamination structure composed of a top cover layer (a), a foam padding layer (b) and a back cover layer (C) in this order, wherein the foam padding layer (b) is made of a slab urethane foam material. A slot-like elongated opening (A) is defined in the bottom wall of trim cover assembly (C). The top cover layer (a) is preferably formed form a textile fabric material, a gigged or raised cloth material and the like. Thus, in addition to being of a rough texture with a friction effect, the trim cover assembly (C) is provided with an elastic property for a purpose to be set forth.

According to the shown embodiment, a pair of first and second extensions (40) (30) are provided within the trim cover assembly (C) in a manner depending from the opening (A). The first and second extensions (40) (30) serve to prevent leakage of a liquid base foaming material (P1) via the opening (A) to the outside during a foaming process to be described later. This particular leakage-preventive structure is, however, known from the U.S. Pat. No. 5,855,831 assigned to the assignee of the present invention, and a detailed information in this particular regard may be obtained from that patent. Hence, within the gist of the present invention, those first and second extensions (40) (30) are just a part of required elements in the method described herein on one hand, and they should not always be formed in the trim cover assembly (C), on the other hand, depending on a particular design or structural simplicity of the trim cover assembly (C), as will be apparent later.

Figure 3:
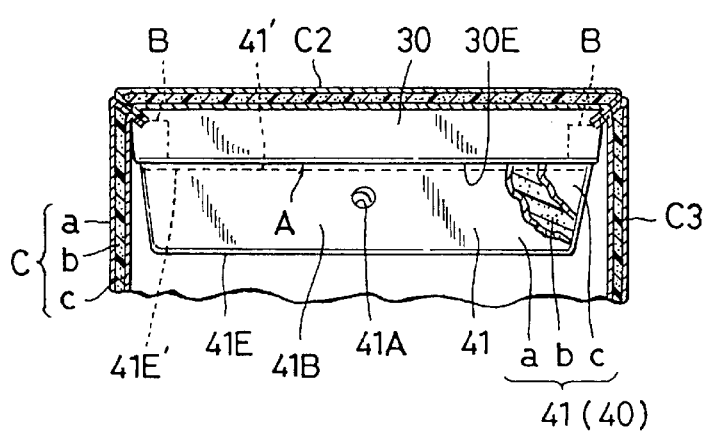
FIG. 3 is a partly broken fragmentary sectional view of a trim cover assembly used in the present invention.

As far as the embodiment shown in FIGS. 1 and 7 is concerned, the trim cover assembly (C) is generally composed of a generally bag-shaped body (C3), a first half wall section (C1), a second half wall section (C2), and a slot-like elongated opening (A) defined between the first and second half wall sections (C1) (C2). Of course, those three sections (C3, C1,C2) are each of the three-layer lamination structure as can be seen in FIG. 3, and sewn with one another to form a predetermined three-dimensional shape of headrest body shown in FIG. 7. In particular, as viewed from FIGS. 1 and 3, the first and second half wall sections (C1) (C2) face with each other to define the elongated opening (A) which extends transversely of and in the width-wise direction of trim cover assembly (C).

The first and second extensions (40) (30) are each formed integrally and continuously from the respective free edges of first and second half wall sections (C1) (C2). As can be seen from FIGS. 1 and 3, the two extensions (40) (30), by the reason that they have the aforesaid three-layer lamination structure, are resiliently biased to contact with each other at their respective top cover layers (a) due to an elastic linear recovery property of the foam wadding layer (b) in each extension. Briefly stated, this normally causes the elongated opening (A) to be resiliently closed between the two extensions (40) (30), thus serving to prevent a liquid base foaming material (see the designation (P1) in FIG. 5 (B)) from being leaked through the opening (A) during a foaming process.

As shown, the first extension (40) includes a projected part (41) which extends continuously therefrom, having the aforementioned three-layer lamination structure, so that the total length of both first extension (40) and projected part (41) is greater than that of the second extension (30). Formed in the projected part (41) is a through-hole (41A) for allowing a nozzle portion (1) to be inserted therethrough. The through-hole (41A) is disposed near to a juncture point between the first extension (40) and projected part (41), whereupon a foldable region (41B) is defined in the area of projected part (41) opposite to that juncture point relative to the through-hole (41A). This foldable region (41B) is to be folded about the end (30E) of the second extension (30) to embracingly close the elongated opening (A) for leakage preventive purpose, as will be explained.

Figure 2:
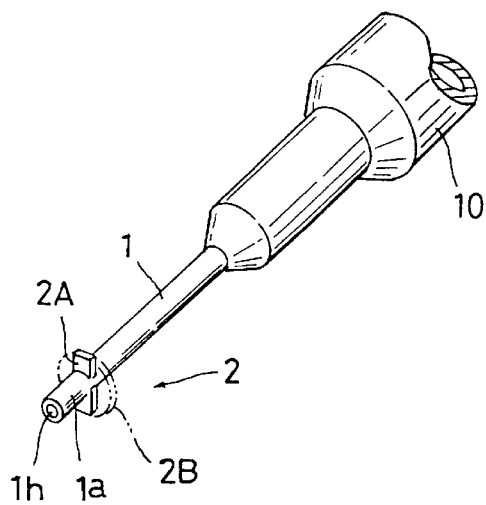
FIG. 2 is a partly broken schematic perspective view of an injection nozzle device used in the present invention.

In accordance with the present invention, there is provided an injection nozzle device (10) as best shown in FIG. 2, including an entrapping or catching means (2) defined at the nozzle portion (1) thereof, which is designed to entrap or catch a portion of the extensions (40) (30) in a generic aspect of the present invention during an introductory step in the method of the present invention to be described later. While not shown, the injection device (10) is connected to a pump device, so that a liquid base foaming material (see designation P1 in FIG. 4 (B)) may be supplied to the device (10) by operation of the pump device and injected from the nozzle portion (1). Designation (1a) denotes a bore of the nozzle portion (1) through which the liquid base foaming material is to be injected.

In the illustrated mode, such entrapping or catching means (2) may be embodied by a pair of catcher pieces (2A) projecting integrally from the nozzle portion (1) diameter-wise in a direction opposite to each other. Alternatively, as indicated by the phantom line, a disc-like catcher piece (2B) may be employed as another mode of the entrapping or catching means (2), which is formed integrally about the circumstance of the nozzle portion (1), projecting radially therefrom relative to the central axis thereof. It is important to note here that the diameter of both modes of catching means (2A and 2B) should be set to a degree at which a tolerable elastic deformation or widening of the through-hole (41A) is attained in order for the catching means (2) to bodily pass therethrough. For, the through-hole (41A) is provided with an elastic property for normally maintaining its original diameter while being resiliently widen relative thereto, due to the aforementioned elastic nature of the three layer materials (a,b,c) used in both first extension (40) and projected part (41). In this regard, it is also noted that the diameter of the through-hole (41A) per se is equal to or slightly smaller than the diameter of nozzle portion (1), but may be resiliently deformed or widened to such a diameter that allows the two catcher pieces (2A) or disc-like catcher piece (2B), which has a relatively large diameter, to pass therethrough. This is important for the purpose of preventing a liquid foaming base material against leakage from the through-hole (41A) as will be noted. However, those two modes of catching means (i.e. 2A and 2B) are not limitative, and the catching means (2) itself may be embodied in any other suitable form insofar as it achieves the same effects as noted above and to be described later within the scopes of the present invention. Designation (1a) denotes an insertion end area which is so defined in the nozzle portion (1) as to be capable of smooth introduction and insertion into the through-hole (41A), thereby permitting for direct, precise guiding of the entrapping or catching means (2A or 2B) to that particular through-hole (41A).

As described in the U.S. Pat. No. 5,855,831, the trim cover assembly (C) per se is preformed in the illustrated three-dimensional fashion, and also, an incomplete headrest unit is assembled ,as can be seen from FIG. 1, by inserting a generally U-shaped headrest frame (F) via the elongated opening (A) into the interior of trim cover assembly (C), while passing the two headrest stay portions (S) thereof (see FIG. 7) through the respective two holes (C10) to project outwardly from the trim cover assembly (C).

Description will now be made of the steps in accordance with the present invention, hereinafter, with particular reference to FIGS. 4(A) to 6.

Figure 4:
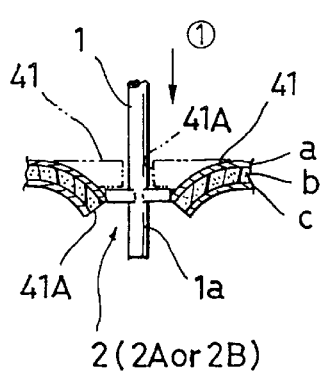
FIG. 4 is a diagram which explanatorily shows how a catching piece provided with the injection nozzle device is to pass through a through-hole formed in an extension associated with the trim cover assembly.
Figure 5A:
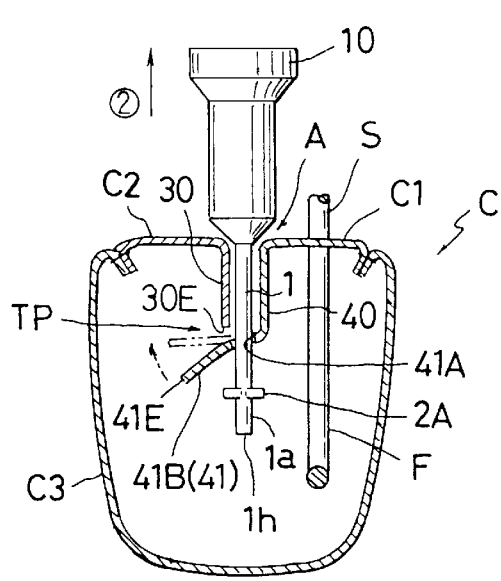
FIGS. 5(A) to 5(D) are diagrams which explanatorily shows the orderly steps of subjecting the incomplete headrest unit to a foaming by way of one preferred mode in accordance with the present invention.

At the first stage, as can be seen from FIG. 1, to the thus-assembled incomplete headrest unit, is mounted the injection nozzle device (10) by inserting its nozzle portion (1) through the elongated opening (A) into the inside of trim cover assembly (C), with a pair of catcher pieces (2A) (or disc-like catcher piece (2B)) passed through the through-hole (41A) of first extension (40), as shown in FIG. 5(A). Specifically stated, at first, the projected part (41) of first extension (40) are in the state of being inclined in a direction to the second extension (30), thereby substantially locating the through-hole (41A) at a point below the opening (A). Then, a worker should insert the nozzle portion (1) of injection nozzle device (10) through the opening (A) into the interior of trim cover assembly (C), and then manipulate the nozzle portion (1) so as to penetrate the insertion end area (1a) thereof into the through-hole (41A) of first extension projected part (41). Thus, such insertion end area (1a) is slidingly moved forwards through the through-hole (41A) so that the two catcher pieces (2A) (or disc-like catcher piece (2B)) are directly introduced to and abutted against a local area of the projected part (41) which adjacently circumscribes the through-hole (41A). At this moment, the worker should continue on inserting the nozzle portion (1) towards the interior of trim cover assembly (C), thereby driving such catcher pieces (2A or 2B) into the through-hole (41A). Hence, as shown in FIG. 4, by applying a force as indicated by the arrow ① to the foregoing local area of projected part (41) via the nozzle portion (1), overcoming a resilient force inherit in the local area, the worker can forcibly deform and widen the through-hole (41A) with a relatively small force and can easily pass the catcher pieces (2A or 2B) wherethrough.

Accordingly, as shown in FIG. 5(A), the nozzle portion (1a) is inserted through both opening (A) and through-hole (41A), with the two catcher pieces (2A) being situated below the projected part (41) of first extension (40) within the hollow interior of trim cover assembly (C).

Next, as indicated by the arrow ② in FIG. 5(A), by drawing the injection nozzle device (10) upwardly (i.e. in a direction opposite to the foregoing first direction ①), the nozzle portion (1) is simultaneously slid upwards through the hole (41A), with the two catcher pieces (2A) being brought to contact with the projected part (41) of first extension (40). At this moment, a worker feels a touch indicative of the catcher pieces (2A) entrapping or catching that projected part (41) and should continue to draw the nozzle portion (1) upwardly so that the projected part (41) is bent by the catcher pieces (2A) in the same direction at a point (TP) to contact the end (30E) of second extension (30) tight as indicated by the phantom line. It is noted here that the thus-bent projected part (41) is in the state of extending horizontally at a right angle with respect to a vertical line of both first and second extensions (40) (30). Thus, the worker feels a stop which is indicative of a positive contact between the base of projected part (41) and the second extension end (30E), whereupon the elongated opening (A) is closed positively thereby within the trim cover assembly (C) as can be seen in FIG. 5(B).

Figure 5B:
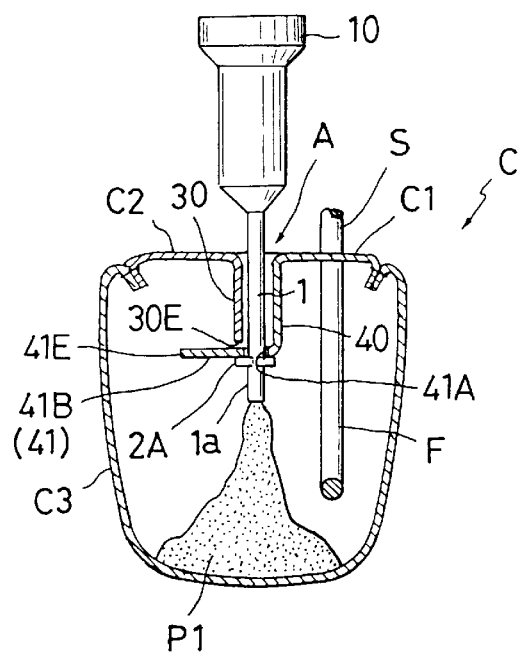
Figure 5C:
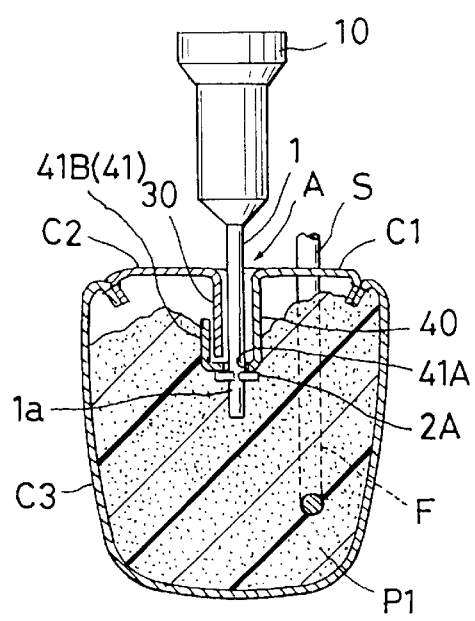

Then, with the opening (A) thus closed, as shown in FIG. 5(B), a predetermined amount of liquid base foaming material (P1) is injected from the nozzle (1) into the hollow interior of trim cover assembly (C), followed by a foaming step shown in FIG. 5(C), using a suitable foaming die (not shown), wherein the liquid material (P1) is cured to increase its mass in the trim cover assembly (C). It is appreciated here that the above-described positive closing of the opening (A) via the catcher pieces (2A) insures avoiding creation of any loosen point or clearance at the opening (A), through which the liquid base foaming material (P1) will invade or will be leaked. Further, It is observed that an increased mass of foaming material (P1) being cured presses the foldable region (41B) associated with the first extension (41) in the upward direction so as to cause that particular foldable region (41B) to fold about the second extension end (30E) and closely contact the outer surface of the second extension (30) as in FIG. 5(C). At the same time, both first and second extensions (40) (30) are contacted tight with each other due to a high pressure being applied to them from both sides by the increased mass of foaming material (P1). Accordingly, it is to be appreciated that a three-fold closing effect is attained in that manner, leading to a complete sealing of the opening (A) against the leakage of liquid base foaming material during the whole foaming processes.

Figure 5D:
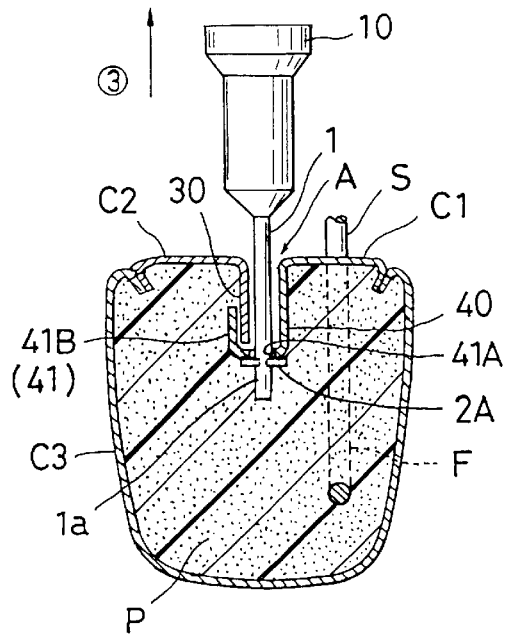
Figure 6:
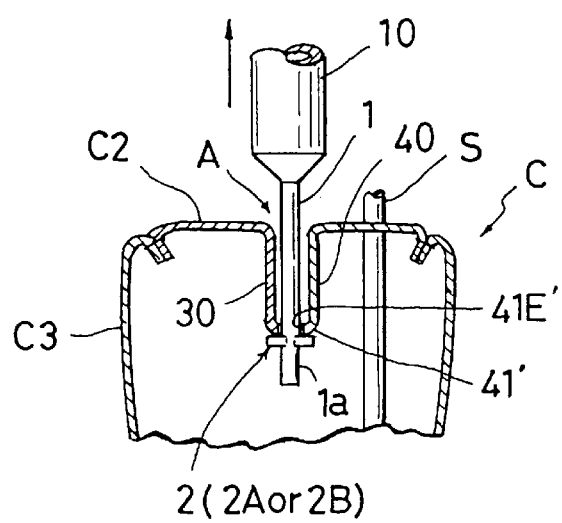
FIG. 6 is a partly broken sectional view showing another alternative mode of an incomplete headrest unit, to which the present invention is applied.

At the completion of the foaming process, a resulting foam padding (P) is created and resiliently filled in the trim cover assembly (C), as shown in FIG. 5(D), after which, the nozzle portion (1) is removed from the opening (A) in the upward arrow direction ③. It is noted here that the two catcher pieces (2A) can easily be escaped through the through-hole (41A), because all the materials surrounding the catcher pieces (2A), i.e. the foaming padding (P), first and second extensions (40) (30), projected part (41) and the through-hole (41A), are of an elastic deformable property as stated earlier, which allows for easy removal of such projected pieces (2A) therefrom by applying a certain drawing force thereto from a worker involved in operation of this final stage.

Figure 8:
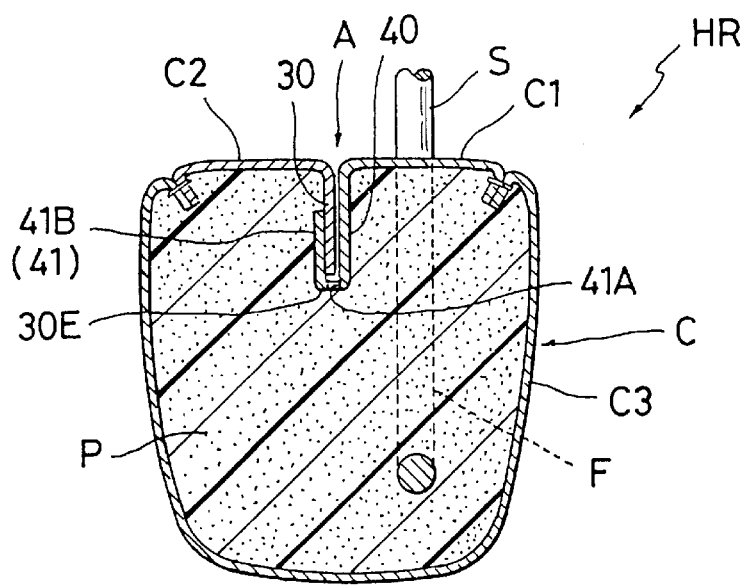
FIG. 8 is a sectional view taken along the line VIII—VIII in the FIG. 7.

After having removed the injection nozzle device (10) from the final product of headrest (of course, also after having removed the final product from a foaming die, through not shown, if any), there is produced a resulting headrest (HD) with two headrest stays (S) (S), which is depicted in FIGS. 7 and 8 as having a tight closed state of the opening (A).

The foregoing descriptions are made only about the two catcher pieces (2A) in conjunction with the FIGS. 5(A) to 5(D), but another mode, i.e. the disc-like catcher piece (2B), may also be employed and used in the same manner as described above throughout the foaming steps.

It is to be also appreciated that the method of the present invention is highly improved over that of the U.S. Pat. No. 5,855,831 in terms of using the catching means (2) for the positive closing of the opening (A) against leakage of liquid base foaming material therethrough.

While having described the present invention thus far, it should be understood that the invention is not limited to the illustrated embodiments, but any other modifications, replacements and additions may be applied thereto structurally and methodologically without departing from the scopes of the appended claims. For example, as understandable from FIGS. 3 and 6, the long projected part (41) employed in the foregoing embodiment may be replaced by a short projected part (41') without the through-hole (41A) therein, even in which case, the entrapping or catching means (2) within the scopes of the present invention will be used to entrap or catch that short projected part (41'). In other words, the projection of the catching means (2), be it two projections (at 2A) or circular projection (at 2B), may be used to catch the short projected part (41') and bend the same towards the edge (3E) of second extension (3), so that a worker can manipulate the nozzle portion (1) and catching means (2) such as to forcibly bring the entirety of projected part (41') to a close contact with the entirety of second extension edge (3E) to completely close the opening (A). Further, instead of the two extesnions (30) (40), only one extension may be formed continuosly from one of the two cover sections (C1) (C2), extending via the opening (A) and projecting within the trim cover assembly (C). In this case, the nozzel portion (1a) may be so manipulated as to cause such one extension to be caught by the catching means (2) and then drawn upwardly to bend and press the extension against the inner wall of two cover sections (C1) (C2) adjacent the opening (A), thereby closing the whole of opening (A) tight. Still further, both two extensions (30) (40) may not be proivded in the trim cover assembly (C), and instead thereof, a suitable member may be used to close the opening (A) in cooperation with the catching means (2).

What is claimed is:

1. A method for forming a headrest, comprising the steps of:

pre-assembling an incomplete headrest unit comprising a three-dimensional trim cover assembly of a predetermined headrest configuration, said three-dimensional trim cover assembly having an opening formed therein and an extension means extending therefrom via said opening into an interior of the three-dimensional trim cover assembly and a headrest frame means having a stay portion, wherein said headrest frame means has been inserted via said opening into and placed in the interior of said three-dimensional trim cover assembly, with said stay portion projecting outwardly therefrom;

providing an injection nozzle means having a catching means for catching said extension means associated with said three-dimensional trim cover assembly;

inserting said injection nozzle means through said opening in a first direction toward the interior of the three-dimensional trim cover assembly, while locating said catching means at said extension means therewithin;

drawing said injection nozzle means in a second direction opposite to said first direction, to thereby catch said extension means;

drawing further said injection nozzle means in said second direction, thereby causing said opening to be closed positively by said extension means and said catching means thereafter, injecting a liquid base foaming material through said injection nozzle means into the interior of said trim cover assembly;

curing said liquid base foaming material to form a foam padding integrally with the interior of said trim cover assembly and said headrest frame means; and thereafter, removing said injection nozzle means from said trim cover assembly, whereby the headrest is formed.

2. The method as defined in claim 1, wherein said catching means comprises a projected piece which is so formed on said injection nozzle means as to project radially therefrom.

3. The method as defined in claim 1, wherein said catching means comprises a pair of projected pieces formed on opposite sides of said injection nozzle means.

4. The method as defined in claim 1, wherein a through-hole is formed in said extension, and wherein both said injection nozzle means and catching means are inserted through said opening at the step of inserting said injection nozzle means.

5. The method as defined in claim 1, wherein said trim cover assembly and extension means are formed from a material having an elastic property, wherein a through-hole is formed in said extension means, thus having the elastic property for allowing its elastic deformation and recovery to its original diameter, and wherein both said injection nozzle means and catching means are inserted through said through-hole while elastically deforming the through-hole, at the step of inserting said injection nozzle means, and are removed via said through-hole from said trim cover assembly at the step of removing the injection nozzle means therefrom.

6. The method according to claim 5, wherein said injection nozzle means includes a nozzle portion having a diameter, wherein said through-hole is of a diameter equal to or slightly smaller than said diameter of said nozzle portion, wherein said catching means comprises a projected catcher piece formed radially from said nozzle portion, said projected catcher piece having a diametric size which permits tolerable elastic deformation or widening of said through-hole in order for the projected catcher piece to bodily pass therethrough.

7. A method for forming a headrest, comprising the steps of:

pre-assembling an incomplete headrest unit comprising a three-dimensional trim cover assembly of a predetermined headrest configuration, said three-dimensional trim cover assembly having an opening formed therein and an extension means extending therefrom via said opening into an interior of the three-dimensional trim cover assembly and a headrest frame means having a stay portion, wherein said headrest frame means has been inserted via said opening into and placed in the interior of said three-dimensional trim cover assembly, with said stay portion projecting outwardly therefrom;

wherein said extension means comprises first and second extensions which are resiliently biased to contact with each other to normally close said opening, said first extension being greater in length than the second extension, with a projected part defined continuously from said first extension, and said second extension having a free end;

providing an injection nozzle means having a catching means for catching said first extension;

inserting said injection nozzle means through said opening in a first direction to the interior of the three-dimensional trim cover assembly, while locating said catching means at said extension means therewithin;

drawing said injection nozzle means in a second direction opposite to said first direction, to thereby catch said first extension;

drawing further said injection nozzle means in said second direction, thereby bending said projected part of the first extension toward the free end of said second extension and causing a tight contact of said projected part with the end of the second extension, so that said opening is closed positively by said first and second extensions;

thereafter, injecting a liquid base foaming material through said injection nozzle means into the interior of said trim cover assembly;

curing said liquid base foaming material to form a foam padding integrally with the interior of said trim cover assembly and said headrest frame means, while said projected part of said first extension is folded about the end of said second extension by a pressure applied from an increased mass of said liquid base foaming material being cured; and thereafter, removing said injection nozzle means from said trim cover assembly, whereby the headrest is formed.

8. The method as defined in claim 7, wherein said first and second extensions are formed from a material having an elastic property, wherein a through-hole is formed in said projected part of the first extension means, thus having the elastic property for allowing said through-hole to be elastically widened and recovered to its original diameter, and wherein both said injection nozzle means and catching means are inserted through said through-hole while elastically widening the through-hole, at the step of inserting said injection nozzle means, and are removed via said through-hole from said trim cover assembly at the step of removing the injection nozzle means therefrom.

9. The method according to claim 8, wherein said injection nozzle means includes a nozzle portion having a diameter, wherein said through-hole is of a diameter equal to or slightly smaller than said diameter of said nozzle portion, wherein said catching means comprises a projected catcher piece formed radially from said nozzle portion, said projected catcher piece having a diametric size which permits tolerable elastic deformation or widening of said through-hole in order for the projected catcher piece to bodily pass therethrough.

* * * * *